United States Patent [19]
Ang

[11] Patent Number: 6,104,523
[45] Date of Patent: Aug. 15, 2000

[54] DUAL BEAM DOUBLE PASS RASTER OUTPUT SCANNER

[75] Inventor: Anthony Ang, Long Beach, Calif.

[73] Assignee: Xerox Corporation, Stamford, Conn.

[21] Appl. No.: 09/219,003

[22] Filed: Dec. 21, 1998

[51] Int. Cl.[7] .................................................. G02B 26/08
[52] U.S. Cl. ...................... 359/216; 359/217; 359/218; 359/204; 359/206; 359/207; 347/233; 347/243
[58] Field of Search .................................... 359/216, 217, 359/218, 219, 204, 206, 207; 347/233, 243, 244

[56] References Cited

U.S. PATENT DOCUMENTS

| | | | |
|---|---|---|---|
| 4,355,860 | 10/1982 | Lavallee | 350/6.8 |
| 4,941,719 | 7/1990 | Hisada | 350/6.8 |
| 5,512,949 | 4/1996 | Fisli et al. | 347/259 |
| 5,550,668 | 8/1996 | Appel | 359/204 |
| 5,757,535 | 5/1998 | Ichikawa | 359/216 |
| 5,831,758 | 11/1998 | Sakai | 359/204 |

*Primary Examiner*—Cassandra Spyrou
*Assistant Examiner*—Leo Boutsikaris
*Attorney, Agent, or Firm*—William Propp

[57] ABSTRACT

A dual infrared beam raster scanning system has overfilled facets on the rotating polygon mirror and a double pass through a two cylindrical lens element f-theta lens group. The raster scanning system has an aspheric collimator lens, an aperture and a four lens element cylindrical lens group in the pre-polygon optics, and a two cylindrical lens element f-theta lens group and a cylindrical wobble correction mirror in the post-polygon mirror optics.

12 Claims, 1 Drawing Sheet

DUAL BEAM DOUBLE PASS RASTER OUTPUT SCANNER

CROSS-REFERENCE TO RELATED APPLICATIONS

This application contains subject matter that is related to subject matter of patent application Serial Number 09/218853 filed contemporaneously with the present application, commonly assigned to the same assignee herein and herein incorporated by reference.

BACKGROUND OF THE INVENTION

The present invention relates to a raster scanning system and, more particularly, to a dual infrared beam, double pass raster scanning system with overfilled rotating polygon mirror facets, only cylindrical scan optical elements and independently moveable lenses.

Many prior art raster output scanners (ROS) utilize a rotating polygon having flat reflective surfaces, or facets, in parallel with the axis of rotation of the polygon. In a typical system, a beam is emitted from a coherent light source such as a diode laser. The light is directed through a pre-polygon conditioning optics, modulated according to an input signal, onto the rotating polygon surfaces. The high speed rotation of the polygon, typically in 3 to 15 krpm range, then scans the beam through a post-polygon conditioning lens and images the laser spot across the full process width of a photosensitive image plane.

In these prior art ROS systems, the pre-polygon conditioning optics typically are incorporated in an underfilled facet design; e.g. the light beam directed against the rotating polygon illuminates only a portion of each rotating facet.

In overfilled facet designs, the light beam completely illuminates each facet and a small portion of adjacent facets. In an overfilled design the requirement for facet size required to produce a given spot size at the image medium is greatly reduced allowing many more facets to be accommodated on the same diameter polygon. This, in turn, permits the scan system to form more scan lines per second with a given polygon motor, or, alternatively, to permit the use of less powerful and less expensive polygon motor drives. The overfilled design has several disadvantages. The throughput efficiency is relatively low (20%), compared to the 50% efficiency of the underfilled design, and the illumination of the imaging facet is not as uniform as the underfilled design. In order to tolerate the low efficiency, a higher powered laser diode is required.

It is well known in the scanning art to use laser diodes to generate a coherent laser beam which is optically shaped and used to scan in a ROS system. It is also known to use multiple laser diodes to create multiple beams, each individual beam independently modulated by video signals, and the multiple beams scanned onto the recording surface as modulated beams. For these multiple beam applications, it has been found advantageous to use arrays of closely spaced laser diodes. Closely spaced diodes allow for multiple beam processing and thus improve data throughput as compared with systems that employ continuous wave, single beam gas or laser diodes. Typically, the laser diodes in a multiple beam system are individually addressable with a separate current source that drives or modulates the diode.

It is an object of the present invention to provide a dual infrared beam, double pass raster scanning system with overfilled rotating polygon mirror facets and only cylindrical scan optical elements

SUMMARY OF THE INVENTION

According to the present invention, a dual infrared beam raster scanning system has overfilled facets on the rotating polygon mirror and a double pass through a two cylindrical lens element f-theta lens group. The raster scanning system has an aspheric collimator lens, an aperture and a four lens element cylindrical lens group in the pre-polygon optics, and a two cylindrical lens element f-theta lens group and a cylindrical wobble correction mirror in the post-polygon mirror optics.

The first two lenses of the four lens element cylindrical lens group can be moved together for optimum tangential focus correction of the dual beams. The third lens and the fourth lens of the four lens element cylindrical lens group can be independently rotated for optimum sagittal focus correction and beam separation compensation of the dual beams.

Other objects and attainments together with a fuller understanding of the invention will become apparent and appreciated by referring to the following description and claims taken in conjunction with the accompanying drawings.

DESCRIPTION OF THE INVENTION

Figure 1:
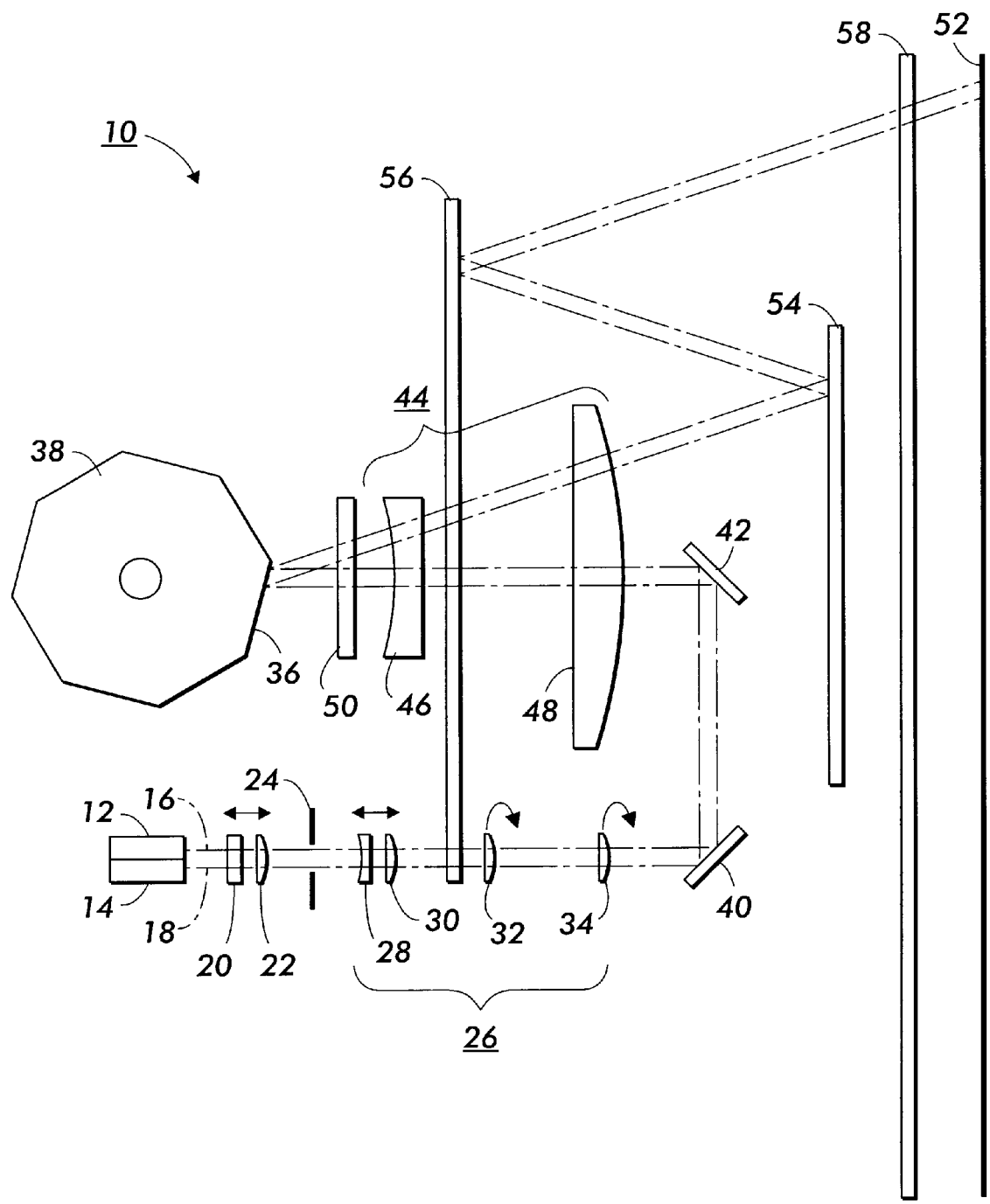
FIG. 1 is a schematic perspective view of the dual infrared beam, double pass raster scanning system formed according to the present invention.

Reference is now made to FIG. 1, wherein there is illustrated a raster output scanning (ROS) system 10 as an embodiment of the present invention. The design specifications for the preferred optical system 10 require a resolution of 600 pixels per inch, over a scan line of 12.2 inches (310 mm).

A pair of laser diodes 12 and 14 emit a pair of modulated light beams 16 and 18 in the infrared wavelength range of 780 nanometers. The dual diodes are separated by a distance of approximately 25 μm, and are oriented in the optical system so that they are offset in the cross scan direction.

The light beams 16 and 18 pass through a flat FK5 Schott glass window 20 of the laser diodes 12 and 14. The dual beams 16 and 18 are next collimated by a plano-convex aspherical SF8 Schott lens 22.

Once transmitted through the aspherical collimating lens 22, the dual beams are then passed through an aperture or rectangular stop 24, where a portion of each beam's intensity may be attenuated. The aperture 24 controls the F/#, which in turn controls the spot size created by the dual beams. The major axis of the rectangle is in the scan plane and the minor axis of the rectangle is in the cross-scan plane. The collimator lens can be moved laterally in the optical path of the dual beams to allow maximum optical throughput through the aperture.

Light beams 16 and 18 are then focused by a four element cylindrical lens group 26. Cylindrical lens group 26 consists of a first concave-plano BK7 Schott lens 28, a second plano-convex BK7 Schott lens 30, a third cylindrical plano-convex BK7 Schott lens 32 and a fourth cylindrical plano-convex BK7 Schott lens 34.

The focal length and position of the cylinder lens group 26 focuses the dual beams in the cross scan plane at the overfilled facet 36 of the rotating polygon mirror 38. The dual beams remain collimated by the cylinder lens group 26 in the scan plane at the facet 36.

The first two lenses 28 and 30 of the four lens element cylindrical lens group 26 can be moved together laterally along the optical path for optimum tangential focus correction of the dual beams. The third lens 32 of the four lens element cylindrical lens group 26 can be independently rotated for optimum sagittal focus correction and beam separation compensation of the dual beams. The fourth lens 34 of the four lens element cylindrical lens group 26 can be independently rotated for optimum sagittal focus correction and beam separation compensation of the dual beams.

Having been focussed in the cross scan plane by cylinder lens group 26, the dual beams are then reflected off the planar surface of the first folding mirror 40, and are then reflected off the planar surface of the second folding mirror 42, in the direction of the facet 36.

After the two reflections, the dual beams are transmitted through the two element f-theta lens group 44. The f-theta lens group consists of a first cylindrical concave-piano F2 Schott scan lens 46 and a second cylindrical plano-convex SF10 Schott scan lens 48. After reflection from the second fold mirror 42, the dual beams will traverse the second f-theta scan lens 48 first from the convex side and then the first f-theta scan lens 46 from the piano side.

The dual beams are then transmitted through a flat BK7 Schott glass window 50 to overfill the facet 36 of the rotating polygon mirror 38. The window 50 serves to eliminate air turbulence and contamination by foreign objects caused by the rotating polygon mirror from effecting the other optical elements of the ROS system 10.

The dual beams 16 and 18 are reflected by the overfilled facet 36. The rotation of the polygon facet surface causes the dual beams to be scanned across the photoreceptor surface 52.

The dual beams 16 and 18 then pass back through the flat window 50 and then the f-theta lens group 44 a second time, in the opposite direction, in a double pass.

Light beams 16 and 18 are then focussed and linearized by the two element f-theta lens group 44 as the beams are transmitted, in sequence, through the first cylindrical concave-plano F2 Schott scan lens 46 and the second cylindrical plano-convex SF10 Schott scan lens 48.

The post-polygon f-theta lens group 44 is designed to provide a linear relationship between the rotation of the polygon mirror 38 and the deflection of the scanned beams 16 and 18 in the scan direction at the photoreceptor surface 52. The photoreceptor 52 moves in a process direction. The main function of the f-theta lens group is to control the scan linearity, in terms of uniform spot displacement per unit angle of polygon rotation.

After the f-theta lens group 44, the dual beams 16 and 18 are reflected by the planar surface of a third folding mirror 54, and then reflected by a cylindrical wobble correction mirror 56, prior to passing through a flat BK7 Schott glass exit window 58. The exit window 58 isolates the ROS system 10 from the remainder of the xerographic engine, keeping ink, grease, dirt and other foreign objects out of the ROS optical elements.

After passing through exit window 58, the dual beams 16 and 18 impinge upon the surface of photoreceptor 52 forming two spots. The two spots each produce a scan line of at least 12 inches (i.e., at least a page width) when scanned across the photoreceptor surface 52 by the rotating polygon mirror 38.

The f-theta scan lens group 44 and the cylindrical wobble correction mirror 56 focus the collimated reflected light beams 16 and 18 in the fast scan direction onto the image plane of the photoreceptor surface 52, and re-image the light focused on the facet 36 in the cross scan direction, onto the image plane of the photoreceptor surface 52. The mirror 56 provides wobble correction or motion compensating optics for the dual beams.

The infrared laser diodes of the present invention will provide 10 erg/cm$^2$ energy density at the image plane of the photoreceptor. This energy density is needed for a 100 pages per minute capability at 600 dots per inch resolution.

The overfilled facets of the present ROS allows for a smaller polygon mirror with more facets, higher duty cycles for maximum use of diode power and lower jitter.

The sagittal offset of the dual laser diodes coupled with a double pass ROS allows for more uniform tangential spot size at the photoreceptor.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A raster output scanner (ROS) imaging system comprising:

a light source for generating two coherent light beams in the infrared wavelength range, said two beams being output along an optical path, a photosensitive image plane, a rotatable multifaceted polygon mirror interposed in the optical path between said light source and said photosensitive image plane for scanning said two light beams directed onto the facets of said polygon mirror in a fast scan and cross scan direction across the photosensitive image plane, said two light beams directed against the rotating polygon mirror overfill illuminating each facet, a post polygon mirror optical system to focus said two light beams reflected from said polygon mirror in said fast scan and cross scan directions onto said photosensitive image plane, said post polygon mirror optical system including a f-theta lens group having two cylindrical lens positioned between said polygon mirror and said photosensitive image plane to control the scan linearity of said two light beams on said photosensitive image plane, and a cylindrical mirror for wobble correction of said two light beams along said scanning of lines on said photosensitive image plane positioned between said f-theta lens group and said photosensitive image plane, and a pre-polygon mirror optical system including an aspherical collimator lens positioned in the optical path between said light source and said polygon mirror, an aperture positioned in the optical path between said collimator lens and said polygon mirror, and a cylindrical lens group having four lens positioned in the optical path between said aperture and said polygon mirror, said cylindrical lens group having power only in the cross scan direction, said collimator lens and said cylindrical lens group focusing said two light beams in the cross scan direction at each facet of said polygon mirror while maintaining the collimation of said two light beams after said cylindrical lens group in the scan direction at each facet of said polygon mirror, wherein said two light beams pass through said f-theta lens group positioned in the optical path between said cylindrical lens group and said facet of said polygon mirror.

2. The raster output scanner (ROS) imaging system of claim 1, wherein said pre-polygon mirror optical system is a folded system and further includes two folding mirrors positioned in the optical path between said cylindrical lens group and said f-theta lens group.

3. The raster output scanner (ROS) imaging system of claim 1, further comprising a scanning window positioned in the optical path between said f-theta lens group and said polygon mirror for preventing contamination and turbulence from said polygon mirror.

4. The raster output scanner (ROS) imaging system of claim 1, wherein said post-polygon mirror optical system is a folded system and further includes a folding mirror positioned in the optical path between said f-theta lens group and said cylindrical mirror for wobble correction.

5. The raster output scanner (ROS) imaging system of claim 1, further comprising an exit window positioned in the optical path between said cylindrical mirror for wobble correction and said photosensitive image plane for preventing the contamination of said raster output scanner imaging system.

6. The raster output scanner (ROS) imaging system of claim 1 wherein said light source for generating two coherent light beams comprises a pair of laser diodes that are offset in the cross scan plane.

7. The raster output scanner (ROS) imaging system of claim 1 wherein said collimating lens is moveable to maximize optical throughput of said two light beams through said aperture.

8. The raster output scanner (ROS) imaging system of claim 1 wherein the first lens and the second lens of said cylindrical lens group are moveable together in said optical path for tangential focus correction of said two light beams.

9. The raster output scanner (ROS) imaging system of claim 1 wherein the third lens of said cylindrical lens group is rotatable for sagittal focus correction of said two light beams and beam separation compensation of said two light beams.

10. The raster output scanner (ROS) imaging system of claim 1 wherein the fourth lens of said cylindrical lens group is rotatable for sagittal focus correction of said two light beams and beam separation compensation of said two light beams.

11. The raster output scanner (ROS) imaging system of claim 1 wherein the first lens and the second lens of said cylindrical lens group are moveable together in said optical path for tangential focus correction of said two light beams, the third lens of said cylindrical lens group is rotatable for sagittal focus correction of said two light beams and beam separation compensation of said two light beams and the fourth lens of said cylindrical lens group is rotatable for sagittal focus correction of said two light beams and beam separation compensation of said two light beams.

12. A raster output scanner (ROS) imaging system comprising:

a light source of a pair of laser diodes offset in the cross-scan plane for generating two coherent light beams in the infrared wavelength range, said two beams being output along an optical path, a photosensitive image plane, a rotatable multifaceted polygon mirror interposed in the optical path between said light source and said photosensitive image plane for scanning said light beams directed onto the facets of said polygon mirror in a fast scan and cross scan direction across the photosensitive image plane, said light beams directed against the rotating polygon mirror overfill illuminating each facet, a post polygon mirror optical system to focus said light beams reflected from said polygon mirror in said fast scan and cross scan directions onto said photosensitive image plane, said post polygon mirror optical system including a f-theta lens group having two cylindrical lens positioned between said polygon mirror and said photosensitive image plane to control the scan linearity of said light beams on said photosensitive image plane, and a cylindrical mirror for wobble correction of said light beams along said scanning of lines on said photosensitive image plane positioned between said f-theta lens group and said photosensitive image plane, a folding mirror positioned in the optical path between said f-theta lens group and said cylindrical mirror for wobble correction, an exit window positioned in the optical path between said folding mirror and said photosensitive image plane for preventing the contamination of said raster output scanner imaging system, and a pre-polygon mirror optical system including an aspherical collimator lens positioned in the optical path between said light source and said polygon mirror, an aperture positioned in the optical path between said collimator lens and said polygon mirror, said collimating lens being moveable to maximize optical throughput of said light beams through said aperture, and a cylindrical lens group having four lens positioned in the optical path between said aperture and said polygon mirror, said cylindrical lens group having power only in the cross scan direction, said collimator lens and said cylindrical lens group focusing said light beams in the cross scan direction at each facet of said polygon mirror while maintaining the collimation of the beam in the scan direction at each facet of said polygon mirror, wherein the first lens and the second lens of said cylindrical lens group are moveable together in said optical path for tangential focus correction of said two light beams, the third lens of said cylindrical lens group is rotatable for sagittal focus correction of said two light beams and beam separation compensation of said two light beams and the fourth lens of said cylindrical lens group is rotatable for sagittal focus correction of said two light beams and beam separation compensation of said two light beams, two folding mirrors positioned in the optical path between said cylindrical lens group and said polygon mirror, and a scanning window positioned in the optical path between said folding mirrors and said polygon mirror for preventing contamination and turbulence from said polygon mirror, wherein said light beams pass through said f-theta lens group positioned in the optical path between said two folding mirrors and said scanning window.

\* \* \* \* \*